United States Patent
Suh et al.

(10) Patent No.: US 7,027,060 B2
(45) Date of Patent: Apr. 11, 2006

(54) METHOD AND APPARATUS FOR ACCELERATING 2-D GRAPHIC DATA

(75) Inventors: Jung-wook Suh, Seoul (KR); Sung-kyu Choi, Bucheon-si (KR); Woo-sung Shim, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 102 days.

(21) Appl. No.: 10/449,519

(22) Filed: Jun. 2, 2003

(65) Prior Publication Data

US 2004/0140978 A1 Jul. 22, 2004

(30) Foreign Application Priority Data

Jan. 20, 2003 (KR) .................... 10-2003-0003663

(51) Int. Cl.
*G06F 12/02* (2006.01)
*G09G 5/37* (2006.01)

(52) U.S. Cl. ...................... 345/544; 345/561
(58) Field of Classification Search ............... 345/503, 345/522, 531, 533, 545, 561, 562, 570, 544; 711/170–173
See application file for complete search history.

(56) References Cited

U.S. PATENT DOCUMENTS

| | | | | |
|---|---|---|---|---|
| 5,218,674 A | * | 6/1993 | Peaslee et al. | 345/562 |
| 5,488,385 A | * | 1/1996 | Singhal et al. | 345/3.1 |
| 5,640,517 A | * | 6/1997 | Parks et al. | 710/105 |
| 5,892,978 A | * | 4/1999 | Munguia et al. | 710/33 |
| 6,092,116 A | * | 7/2000 | Earnest et al. | 709/236 |
| 6,411,302 B1 | * | 6/2002 | Chiraz | 345/545 |
| 6,597,364 B1 | * | 7/2003 | Chiu et al. | 345/562 |
| 6,657,636 B1 | * | 12/2003 | Pether et al. | 345/562 |
| 2004/0085322 A1 | * | 5/2004 | Alcorn et al. | 345/562 |
| 2004/0100472 A1 | * | 5/2004 | Linzer et al. | 345/536 |

* cited by examiner

Primary Examiner—Kee M. Tung
(74) Attorney, Agent, or Firm—Sughrue Mion, PLLC

(57) ABSTRACT

Provided are a method and apparatus for accelerating graphic data which can reduce the computational complexity of graphic processing data. The method of accelerating two-dimensional graphic data includes: receiving information regarding the width of a graphic window to be processed; reading pixel data from a memory in which pixel data in the graphic window is stored; receiving information regarding two pixel data regions which are divided from the memory area based on the width information of the graphic window, one pixel data region to be processed using a burst mode and the other pixel data region to be processed in units of bytes; and individually performing predetermined graphic processing on the divided pixel data regions.

17 Claims, 10 Drawing Sheets

FIG. 3

| | | Boolean Operation | ROP CODE | NAME |
|---|---|---|---|---|
| PATTERN(P) | 11110000 | | | |
| SOURCE(S) | 11001100 | | | |
| DESTINATION(D) | 10101010 | | | |
| RESULT | 00000000 | 0 | 0x0000 | BLACKNESS |
| | 00010001 | ~ (S\|D) | 0x1111 | NOTSRCERASE |
| | 00110011 | ~S | 0x3333 | NOTSRCCOPY |
| | 01000100 | S & ~D | 0x4444 | SRCERASE |
| | 01010101 | ~D | 0x5555 | DSTINVERT |
| | 01011010 | P^D | 0x5A5A | PATINVERT |
| | 01100110 | S^D | 0x6666 | SRCINVERT |
| | 10001000 | S & D | 0x8888 | SRCAND |
| | 10111011 | ~ S\|D | 0xBBBB | MERGEPAINT |
| | 11000000 | P & S | 0xC0C0 | MERGECOPY |
| | 11001100 | S | 0xCCCC | SRCCOPY |
| | 11001110 | S\|D | 0xEEEE | SRCPAINT |
| | 11110000 | P | 0xF0F0 | PATCOPY |
| | 11111011 | P\| ~ S\|D | 0xFBFB | PATPAINT |
| | 11111111 | 1 | 0xFFFF | WHITENESS |

METHOD AND APPARATUS FOR ACCELERATING 2-D GRAPHIC DATA

This application claims the priority of Korean Patent Application No. 2003-3663 filed 20 Jan. 2003, in the Korean Intellectual Property Office, the disclosure of which is incorporated herein in its entirety by reference.

BACKGROUND OF THE INVENTION

1. Field of the Invention

The present invention relates to a method and apparatus for processing graphic data, and more particularly, to a two-dimensional (2D) graphic acceleration method and apparatus which can reduce the computational complexity of graphic processing data.

2. Description of the Related Art

Graphic data is processed using one of various methods in a windows operating system. There are a variety of types of Windows operating systems but Windows CE is more frequently used in a personal digital assistant (PDA) or a small-sized computer. Windows CE version 4.0 and the latest version 4.1 (WinCE.NET) are part of windows embedded operating system. When two-dimensional (2D) graphic data is processed in WinCE.NET, a graphic device driver receives a raster operation code from the WinCE and processes the 2D graphic data as instructed in the raster operation code. A 2D graphic accelerator is designed to process raster operation codes, which are commonly used or inefficient to be processed by software, by hardware. Graphic processing as defined in a raster operation code can also be performed in a window operating system other than WinCE.

When processing 2D graphic data, graphic data is expressed with the number of bits per pixel (bpp) of data. For instance, graphic data can be expressed as 1 bpp, 4 bpp, 8 bpp, 16 bpp, 24 bpp, or 32 bpp. Here, 1 bpp indicates that a pixel of data is expressed with 1bit and one pixel has at most 2 distinct colors, i.e., black and white. That is, graphic data of 1 bpp can be expressed only in black and white. In the same way, 4 bpp indicates that a pixel of data is expressed with 4 bits and one pixel has at most 16 distinct colors, while 8 bpp indicates that a pixel of data is expressed with 8 bits and one pixel has at most 256 distinct colors. In general, graphic processors use color graphic data of 8 bpp or more, and graphic data, which is transmitted together with a raster operation code, is aligned in units of bytes in a window operating system such as WinCE. Therefore, in the case of continuous pixels of 8 bpp or more, it is complicated to address a memory in which these pixels are stored when performing a raster operation on these pixels. For instance, when performing a negative SRCCOPY raster operation on byte-aligned pixel data, very complicated control operations are required to address a memory area in which the pixel data is stored.

SUMMARY OF THE INVENTION

The present invention provides a method and apparatus for accelerating 2-dimensional (2D) graphic data, in which byte-aligned graphic data is divided into two regions: one region to be processed in units of bytes; and the other region to be processed using a burst mode.

According to an aspect of the present invention, there is provided a method of accelerating two-dimensional (2D) graphic data, the method comprising dividing a memory area storing pixel data into two pixel data regions based on information regarding a graphic window to be processed, one pixel data region to be processed using a burst mode and the other pixel data region to be processed in units of bytes; and individually performing predetermined graphic processing on the divided two pixel data regions.

According to another aspect of the present invention, there is provided a method of accelerating 2D graphic data, comprising: receiving information regarding the width of a graphic window to be processed; reading pixel data from a memory in which pixel data in the graphic window is stored; receiving information regarding two pixel data regions which are divided from the memory area based on the width information of the graphic window, one pixel data region to be processed using a burst mode and the other pixel data region to be processed in units of bytes; and individually performing predetermined graphic processing on the divided pixel data regions.

According to yet another aspect of the present invention, there is provided an apparatus for accelerating 2D graphic data, comprising a software device driver which receives information regarding the width of a graphic window to be processed and the location of pixel data, and divides the pixel data in the graphic window into two pixel data regions, one pixel data region to be processed using a burst mode and the other pixel data region to be processed in units of bytes; a window division information receiving unit which receives the information regarding the division of the graphic window and then receives the divided pixel data regions from memory, which stores the pixel data of the graphic window, based on the division information; and a graphic operation performing unit which performs predetermined graphic processing the divided pixel data regions.

According to still another aspect of the present invention, there is provided a computer readable recording medium that records a program for executing such a method in a computer.

BRIEF DESCRIPTION OF THE DRAWINGS

The above and other aspects and advantages of the present invention will become more apparent by describing in detail preferred embodiments thereof with reference to the attached drawings in which:

FIG. 3 is a table illustrating examples of common raster operation codes;

DETAILED DESCRIPTION OF THE INVENTION

Figure 1:
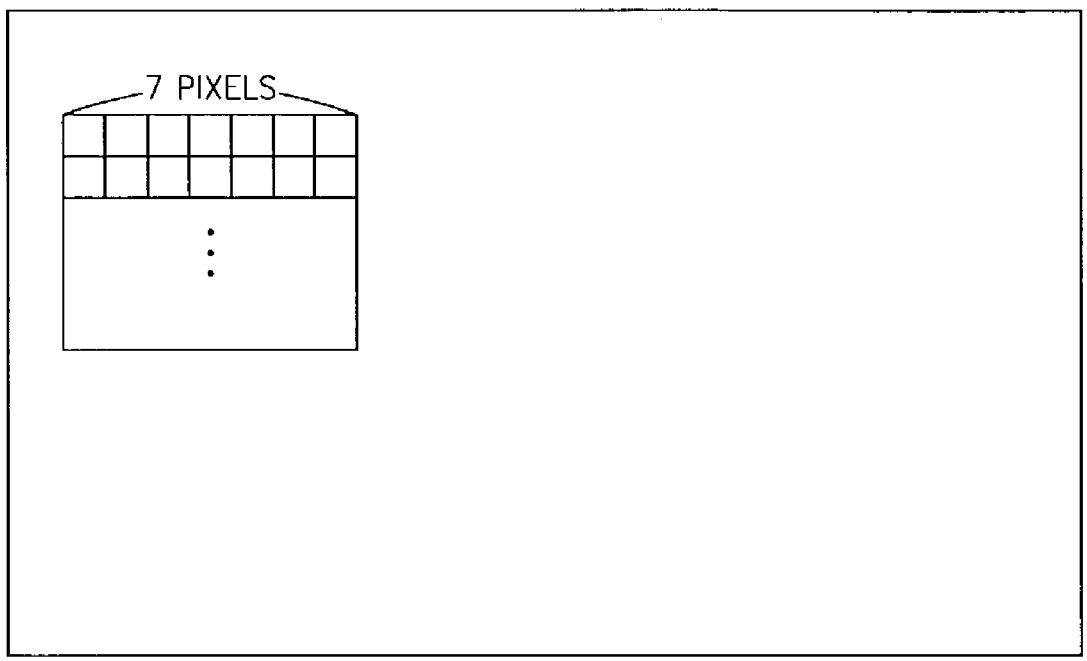
FIG. 1 illustrates an example of a graphic window having a width of 7 pixels, showing the shape of graphic data stored in a memory.

FIG. 1 is a diagram illustrating an example of a graphic window having a width of 7 pixels, showing a method of storing graphic data in a memory. The shape of a graphic window containing graphic data depends on the number of bits per pixel (bpp) of the graphic data, as shown in FIGS. 2A and 2B.

Figure 2A:
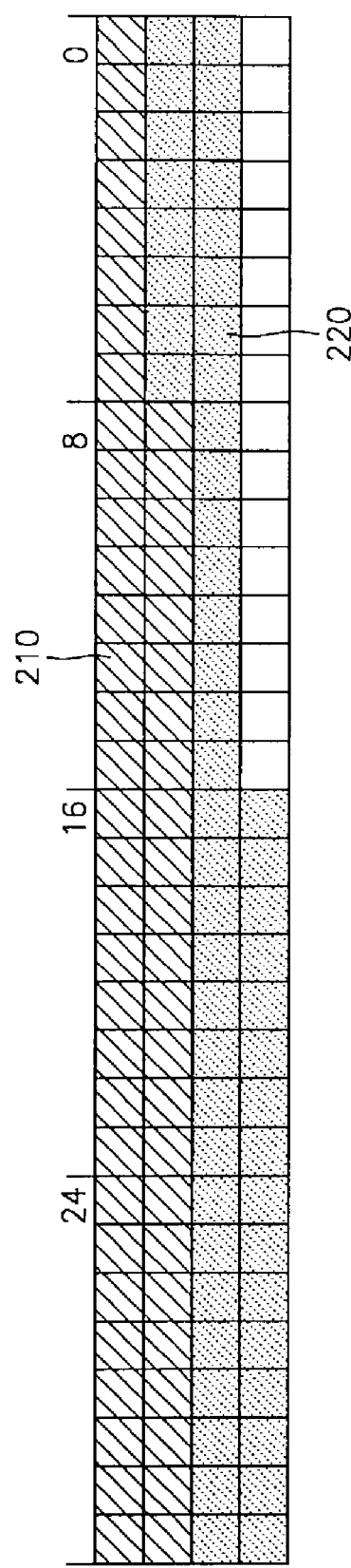
FIGS. 2A and 2B illustrate graphic data of 8 bits per pixel (bpp) and graphic data of 16 bpp which are stored in a memory.
Figure 2B:
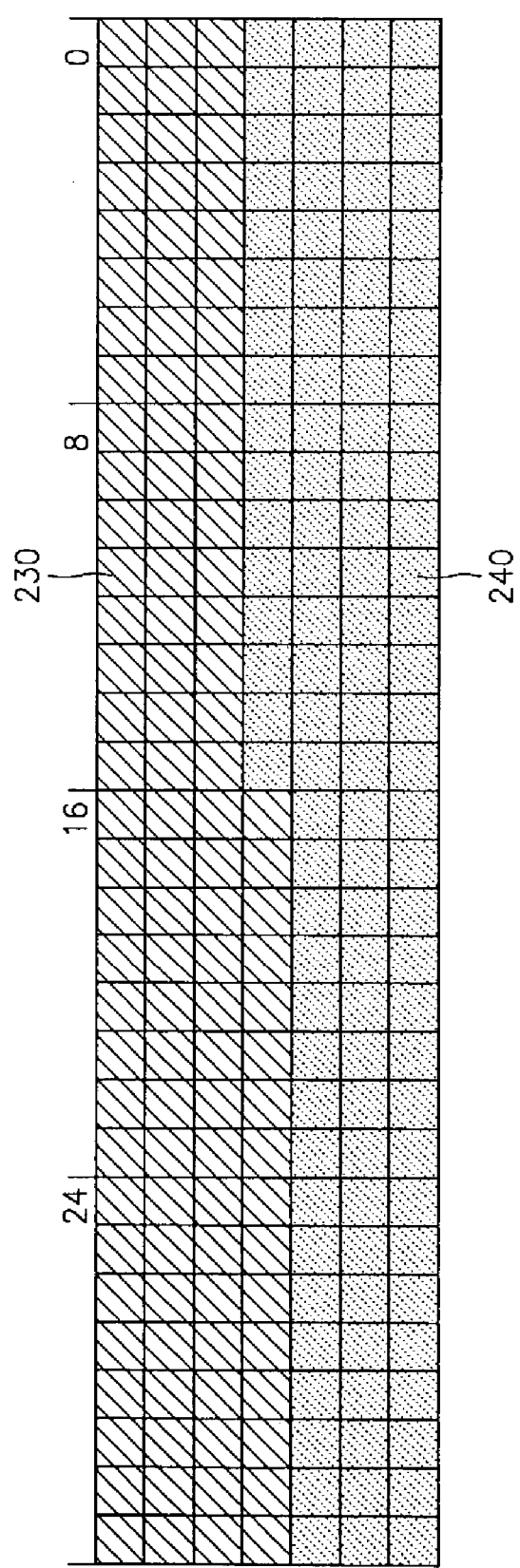

FIGS. 2A and 2B are diagrams illustrating examples of the shapes of graphic data of 8 bpp and graphic data of 16 bpp which are stored in a memory, respectively. A bus of graphic accelerating hardware is configured with 32 bits to match a 32-bit structure of an ARM processor. Thus, the graphic accelerating hardware processes data in units of 32 bits. If graphic data in a graphic window having a width of 7 pixels as shown in FIG. 1 is expressed as 8 bpp, seven pixels of graphic data 210 of 8 bits are sequentially stored in a 32-bit memory as shown in FIG. 2A and the last byte of the 32-bit memory is not occupied by the graphic data 210. For an efficient use of the memory, the last one byte must also be occupied by data. Thus, seven pixels of graphic data 220 in the second row of the graphic window are sequentially stored in the memory. If the graphic data is expressed as 16 bpp, seven pixels of graphic data 230 of 16 bits are sequentially stored in the 32-bit memory and the last two bytes are not occupied by data, as shown in FIG. 2B. Likewise, for an efficient use of the memory, seven pixels of graphic data 240 at the second row of the graphic window of FIG. 1 are sequentially stored in the memory, as shown in FIG. 2B.

FIG. 3 is a table illustrating examples of common raster operation codes. The raster operation codes define processing of graphic data as to how a source bitmap, a destination bitmap, and a pattern are combined with one another in order to display graphic data on a screen. There are 256 types of raster operation codes. A result of processing graphic data as defined in raster operation codes, such as SRCCOPY, NOTSRCCOPY, SRCPAINT, SRCAND, and SRCINVERT, will be explained with reference to FIG. 4.

Figure 4:
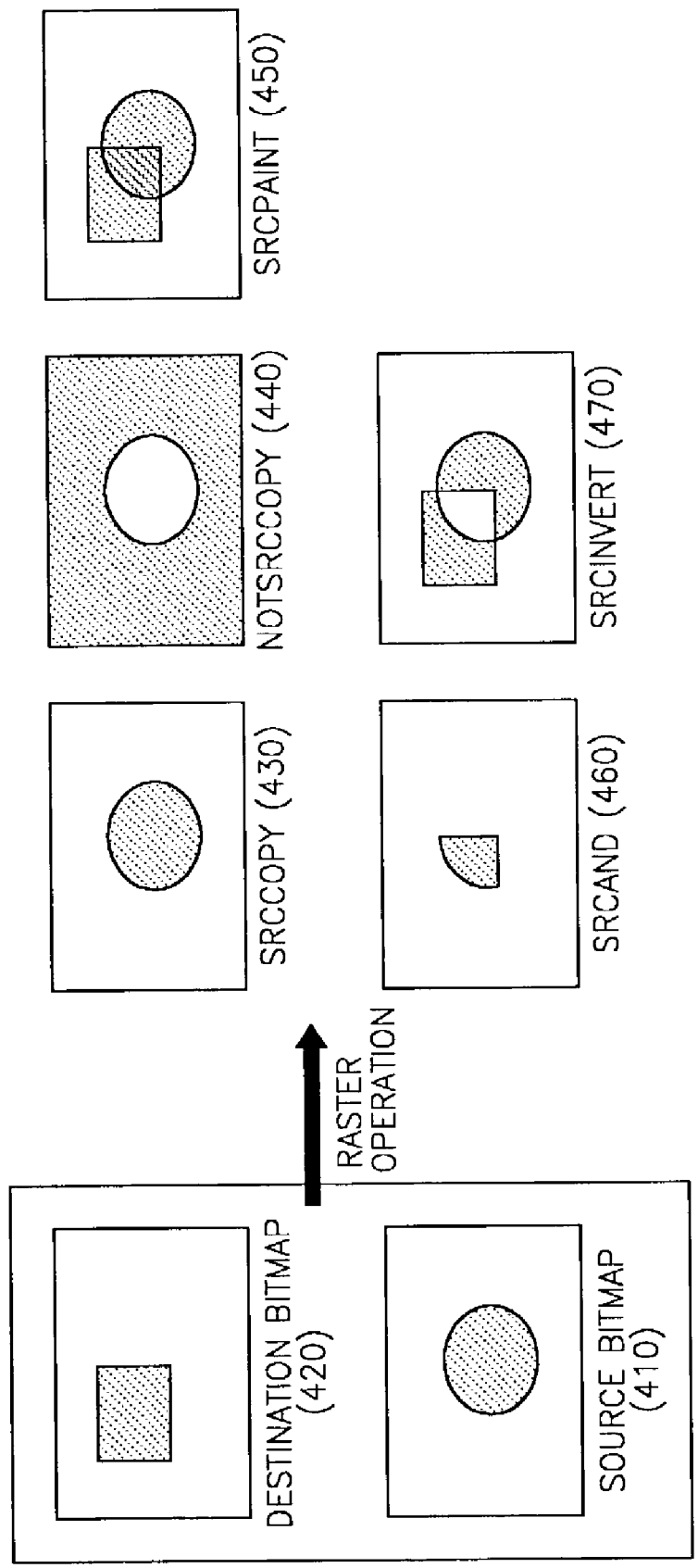
FIG. 4 illustrates results obtained by raster operations.

FIG. 4 illustrates results obtained by various raster operations. In FIG. 4, SRCCOPY 430 denotes an operation in which a source bitmap 410 is copied directly to a destination bitmap 420. NOTSRCCOPY 440 denotes an operation that reverses a result obtained by the SRCCOPY 430. SRCPAINT 450 denotes an operation in which the source bitmap 410 and the destination bitmap 420 are displayed at once. SRCAND 460 is an operation that displays an overlapping portion of the source bitmap 410 and the destination bitmap 420. SRCINVERT 470 is an operation that reverses a result obtained by the SRCAND 460. The use of these raster operations during transmission of a block of bits of data will be described with reference to FIG. 5.

Figure 5:
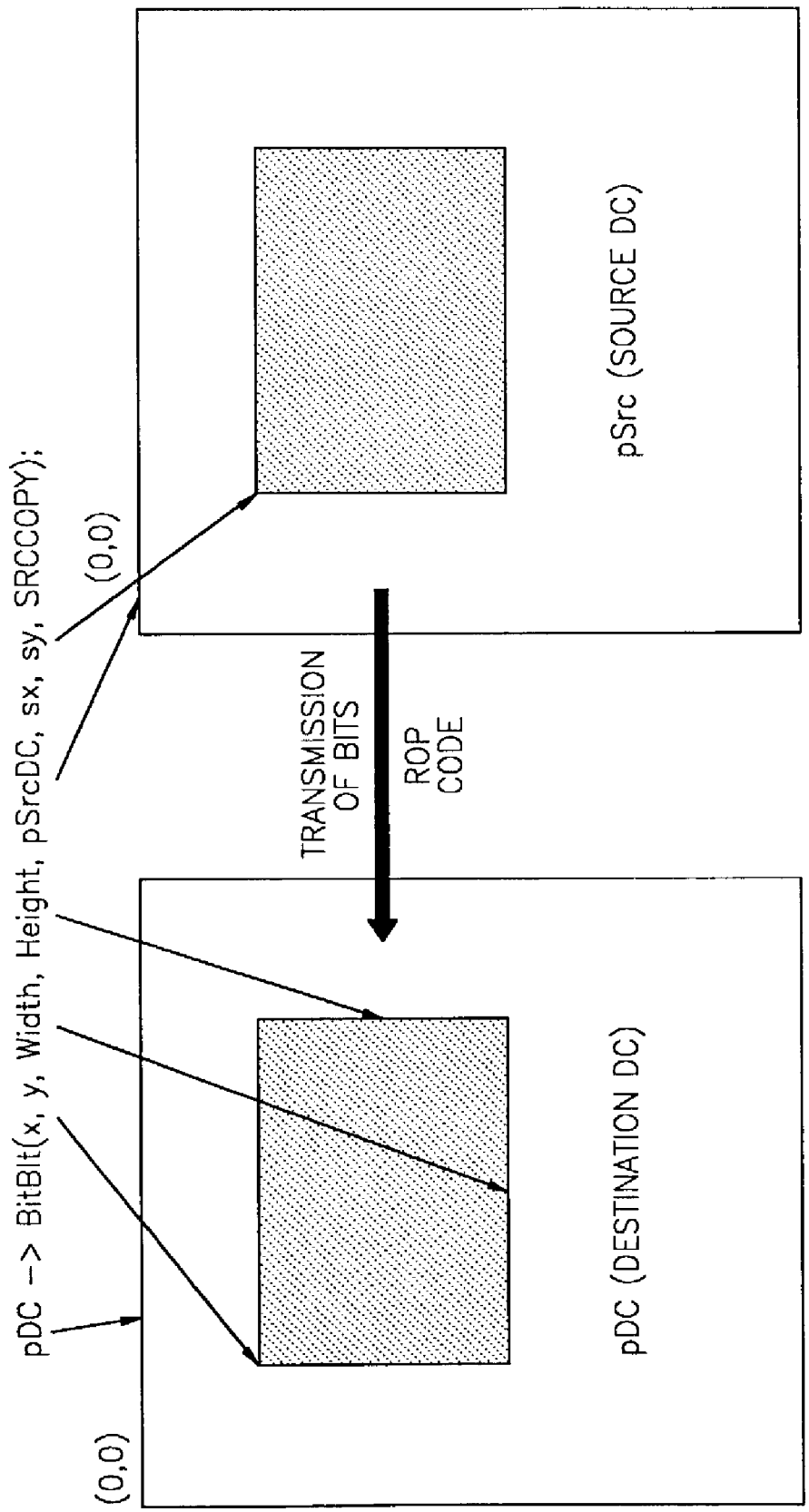
FIG. 5 illustrates an example of transmission of a block of bits of data using a SRCCOPY raster operation.

FIG. 5 illustrates an example of transmission of a block of bits of data using the SRCCOPY raster operation. Referring to FIG. 5, BitBlt is a function that performs one-to-one copying data from a source device context (DC) to a destination DC. Command syntaxes as shown in FIG. 5 are used when performing the BitBlt function using the SRCCOPY raster operation. The SRCCOPY raster operation is divided into two types which will be explained in greater detail with reference to FIGS. 6A and 6B.

Figure 6A:
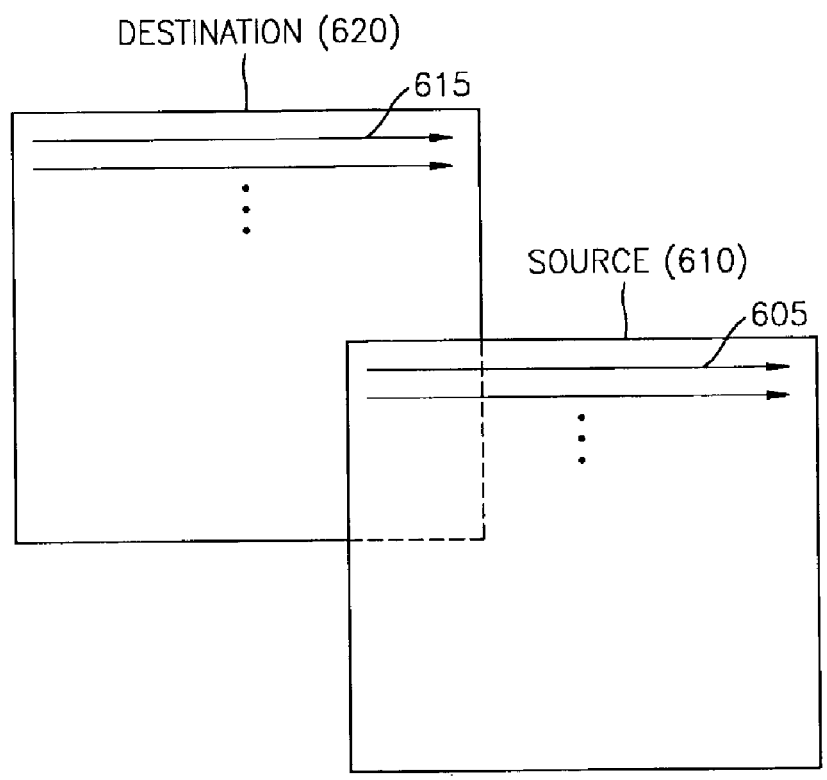
FIG. 6A illustrates a positive SRCCOPY raster operation.

FIG. 6A illustrates a positive SRCCOPY raster operation. The SRCCOPY is an operation in which pixel data stored in a source DC is directly copied to a destination DC in order to display the pixel data on a screen. The SRCCOPY is divided into a positive type and a negative type according to a direction along which the pixel data is copied from the source DC to the destination DC. Referring to FIG. 6A, a left top of a source 610 is overlapped on a right bottom of a destination 620. Therefore, during the positive SRCCOPY raster operation, pixel data stored in the source 610 is sequentially copied from an uppermost row of the source 610 in a left direction, i.e., in a direction of arrows 605, to the destination 620 in a direction of arrows 615. In this case, there is no loss in the pixel data during the copying operation.

Figure 6B:
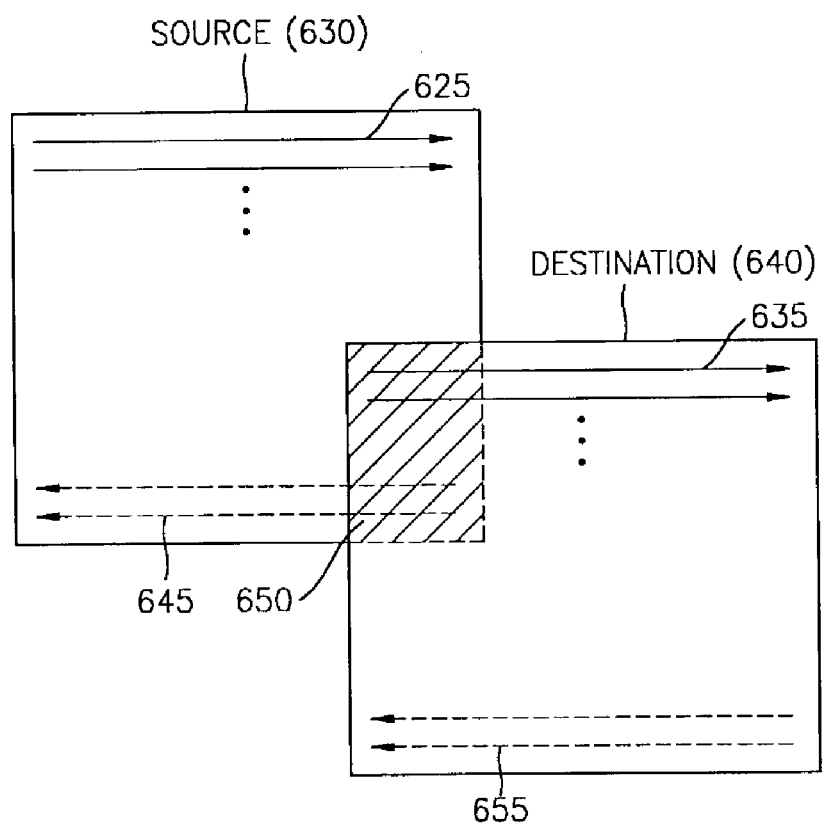
FIG. 6B illustrates a negative SRCCOPY raster operation.

FIG. 6B illustrates a negative SRCCOPY raster operation. Referring to FIG. 6B, a right bottom of a source 630 is overlapped on a left top of a destination 640. Let us assume that pixel data stored in the source 630 is copied to the destination 640 as instructed in the aforementioned positive SRCCOPY raster operation. That is, pixel data stored in the source 630 is sequentially copied from an uppermost row of the source 630 in a direction of arrows 625 to a destination 640 in a direction of arrows 635. However, in this case, the pixel data in the source 630 has already been overwritten to an overlapping region 650 of the source 630 and the destination 640, thereby erasing pixel data in the overlapping region 650 of the source 630.

Accordingly, to solve this problem, the pixel data in the source 630 must be sequentially copied from a lowermost row of the source 630 from right to left, i.e., in a direction of arrows 645, to the destination 640 in a direction of arrows 655, thereby preventing a loss in the pixel data. In other words, the pixel data stored in the source 630 is copied to the destination 640 in the reverse order of which it was recorded. In conclusion, to solve this problem, the negative SRCCOPY raster operation, in which the pixel data is read from the source 630 in the reverse order from the last pixel data recorded, is used.

However, in general, very complicated control operations are required to address a memory region containing pixel data using hardware for accelerating graphic data in order to perform the negative SRCCOPY raster operation on byte-aligned pixel data, thereby reducing a speed of accelerating the graphic data. A bus, which is used in the hardware, is configured in units of words, not in units of bytes, each word consisting of four bytes. Therefore, additional control operations are required to process buses in units of bytes for every pixel data, and thus, it is impossible to transmit graphic data using a burst mode which is an advantage of processing graphic data by hardware, thereby reducing data processing efficiency.

Figure 7:
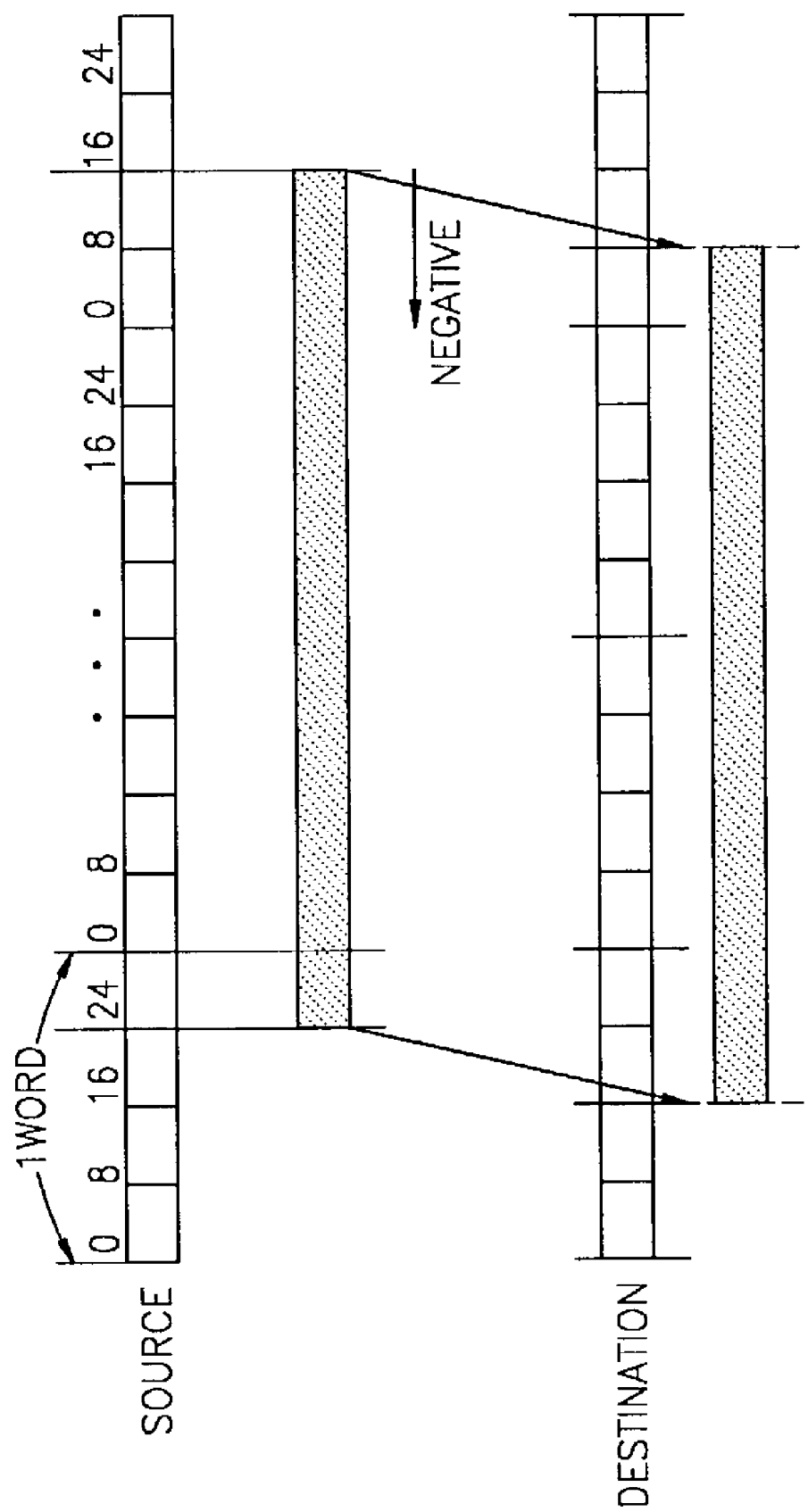
FIG. 7 illustrates the structure of a memory in which the negative SRCCOPY raster operation is performed to copy data stored in a source to a destination.

FIG. 7 illustrates the structure of a memory in which the negative SRCCOPY raster operation is performed to copy data stored in a source to a destination. Referring to FIG. 7, pixel data is byte-aligned in the memory. In this case, it is not efficient to read and process the pixel data in the memory using graphic accelerating hardware which processes data in units of 32-bit words.

Figure 8:
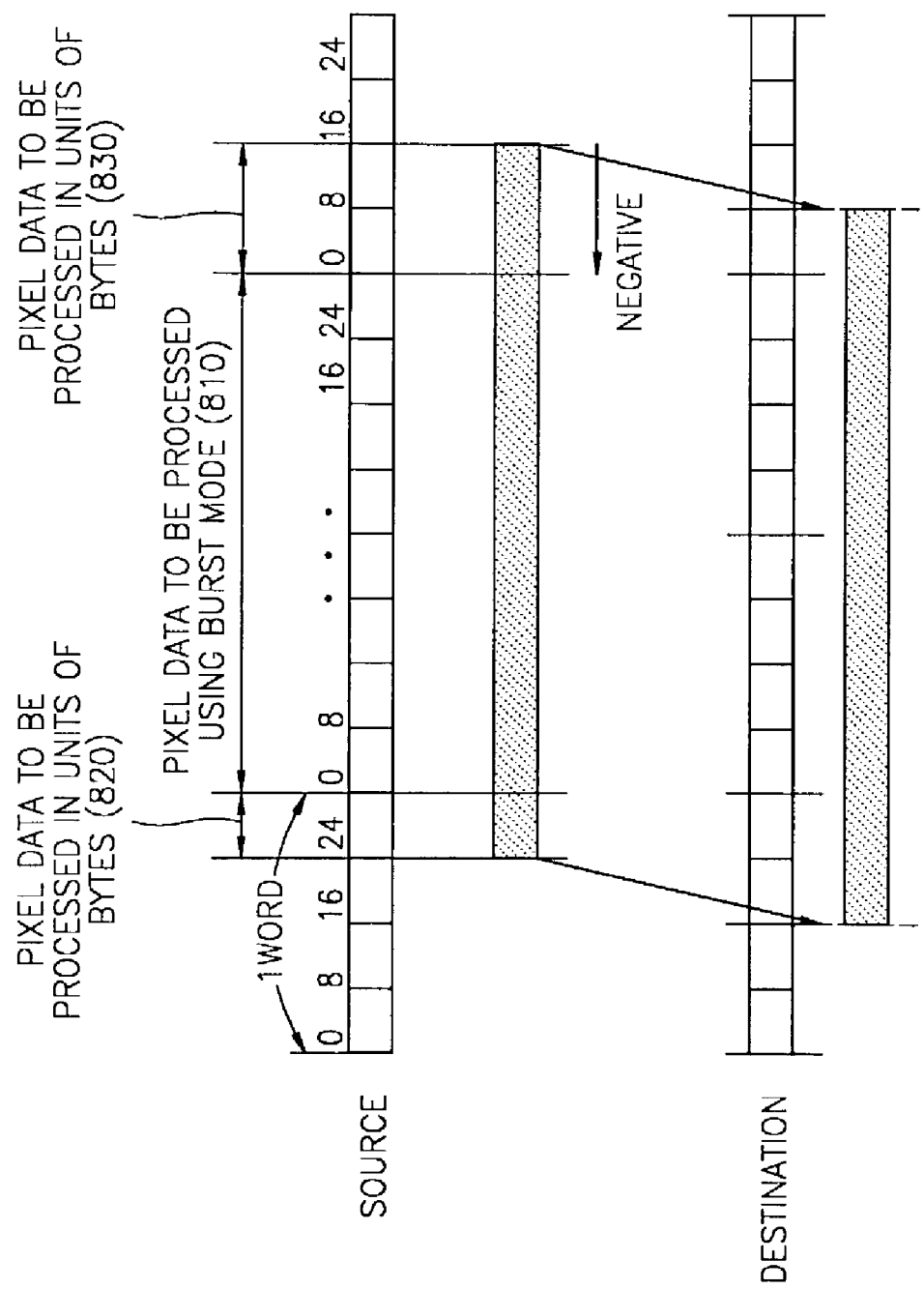
FIG. 8 illustrates a process of performing the negative SRCCOPY raster operation.

FIG. 8 illustrates a process of performing the negative SRCCOPY raster operation. Referring to FIG. 8, a software device driver divides a window of pixel data into three pixel data regions 810, 820, and 830 along the length of the window, on which the SRCCOPY raster operation is performed. That is, the pixel data is processed to match the size of a hardware buffer. In detail, the pixel data region 810 is a pixel data region to be processed using a burst mode, and the pixel data regions 820 and 830 are pixel data regions to be processed in units of bytes. Accordingly, almost the same result can be obtained using a buffer whose size is smaller than the line width of the window, as compared with the case of a buffer whose size is equivalent to the maximum line width of the window. That is, according to the present invention, it is possible to obtain the same result when performing the SRCCOPY raster operation with a small-sized memory instead of a large-sized memory. In conclusion, the size of a line buffer must not exceed the maximum line width of the window, and it is preferable that the line width of the window is divided using a small buffer during the SRCCOPY raster operation in order to reduce a processing delay time and obtain the same effect. For instance, in the case of a personal digital assistant (PDA) using a liquid crystal display (LCD) of 800×600 pixels, the maximum width of a window consists of 800 pixels. Therefore, it is efficient to select a line buffer whose size is smaller than 800 pixels and divide the window along a length direction into two or three parts.

As described above, according to the present invention, pixel data can be divided into a portion to be immediately processed using a burst mode, and a portion to be processed in units of bytes.

Figure 9:
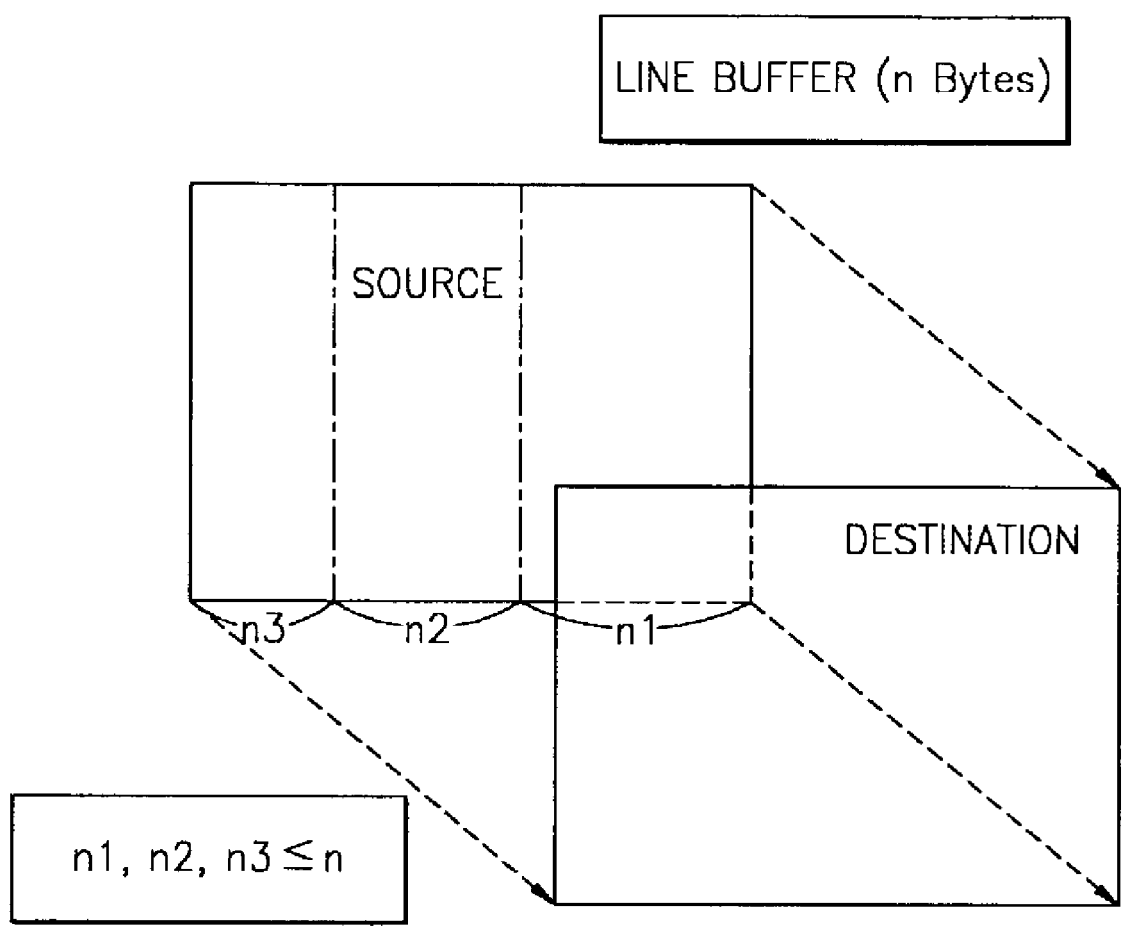
FIG. 9 illustrates a method of dividing the width of a source bitmap window.

FIG. 9 illustrates a method of dividing a source bitmap window along a length direction. Referring to FIG. 9, the source bitmap window is divided into three parts n1, n2, and n3, assuming that the size of a hardware buffer is n (n1, n2, n3≦n). As shown in FIG. 9, a ratio of dividing the source bitmap window is determined in consideration of the size of the buffer. If the line width of an image to be processed is long, the larger a divided source bitmap window to be processed using a burst mode, the better an obtained result. The method of FIG. 9 is applicable to other raster operations, including the negative SRCCOPY raster operation.

Figure 10:
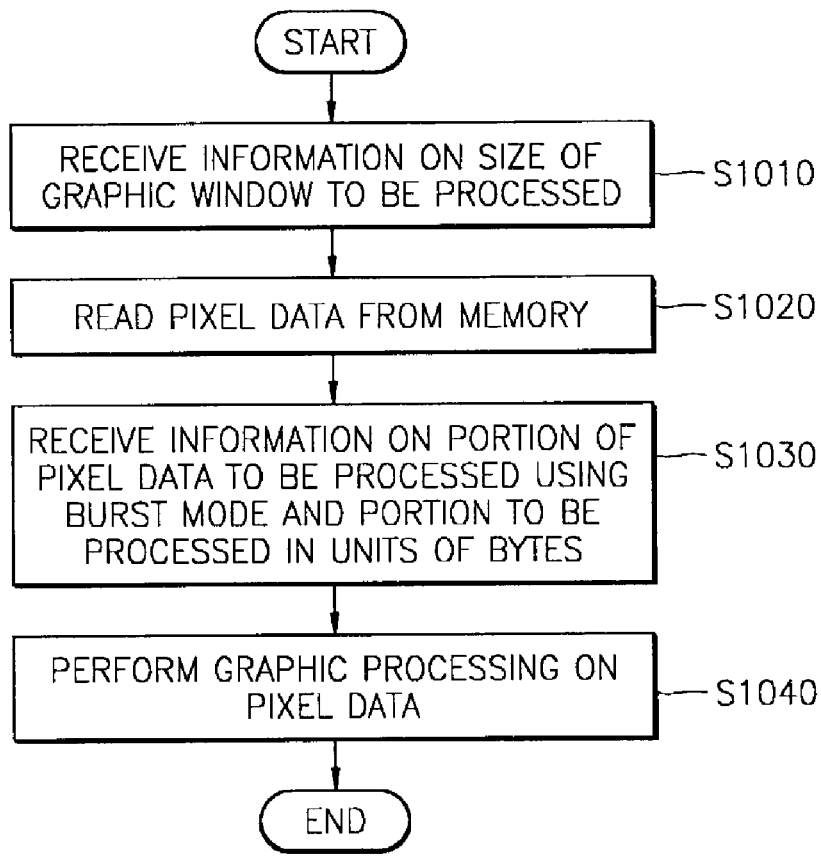
FIG. 10 is a flowchart illustrating a method of accelerating graphic data according to a preferred embodiment of the present invention.

FIG. 10 is a flowchart illustrating a method of accelerating graphic data according to a preferred embodiment of the present invention. Referring to FIG. 10, graphic accelerating hardware receives information regarding the width of a graphic window to be processed from a software device driver in step 1010. The width information includes information regarding the location and line width of the graphic window. After step 1010, pixel data is read from a memory in which pixel data of the graphic window is stored in step 1020. Next, the graphic accelerating hardware receives a portion of the pixel data to be processed using a burst mode, and other portions of the pixel data to be processed in units of bytes, which are divided in consideration of the line width of the graphic window, from the software device driver, in step 1030. Next, the graphic accelerating hardware performs graphic processing such as a raster operation on the divided portions of the pixel data in step 1040.

Here, the pixel data is divided to be smaller than the size of a buffer in which the pixel data of the graphic window is stored, and the pixel data is aligned in units of bytes. The pixel data can be expressed as 8 bpp, 16 bpp, or 24 bpp. Also, the raster operations mentioned in the preferred embodiment of the present invention are performed as defined in raster operation codes provided by the WinCE operating system.

Figure 11:
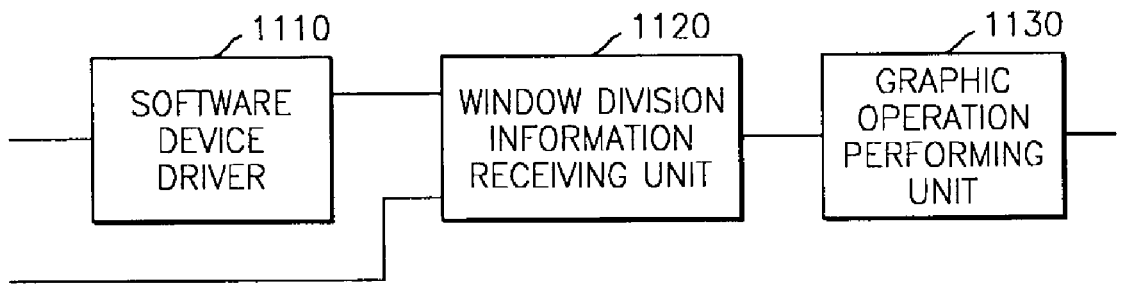
FIG. 11 is a block diagram of an apparatus for accelerating graphic data according to a preferred embodiment of the present invention.

FIG. 11 is a block diagram of an apparatus for accelerating graphic data according to a preferred embodiment of the present invention. Referring to FIG. 11, the apparatus includes a software device driver 1110, a window division information receiving unit 1120, and a graphic operation performing unit 1130.

The software device driver 1110 receives information regarding the width and a graphic window to be processed and the location of pixel data. Then, in consideration of the width of the graphic window, the software device driver 1110 divides pixel data stored in a memory into two parts: one part to be processed using a burst mode; and the other part to be processed in units of bytes. Here, each of the two parts is smaller than the size of a buffer in which the pixel data of the graphic window is stored.

The window division information receiving unit 1120 receives information regarding the division of the graphic window from the software device driver 1110 and receives the divided parts of the pixel data from a memory in which the pixel data is stored, based on the division information. Here, the pixel data is aligned in units of bytes and expressed with the number of bits per pixel, e.g., 8 bpp, 16 bpp, or 24 bpp, that is not consistent with the unit of data processed by the graphic accelerating hardware.

The graphic operation performing unit 1130 performs graphic processing on the divided parts of the pixel data. According to this embodiment, the graphic operation performing unit 1130 receives a raster operation code provided by the WinCE operating system and performs raster operations on pixel data as defined in the raster operation code.

The present invention can be embodied as a computer readable code in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be dispersively installed in a computer system connected to a network, and stored and executed as a computer readable code in a distributed computing environment.

While this invention has been particularly shown and described with reference to preferred embodiments thereof, it will be understood by those skilled in the art that various changes in form and details may be made therein without departing from the spirit and scope of the invention as defined by the appended claims.

As described above, in a method and apparatus of accelerating 2-dimensional graphic data according to the present invention, graphic data is divided into a part, which is to be processed in units of bytes, and a part, which is to be processed using a burst mode, and the divided parts of the graphic part are individually processed by graphic accelerating hardware, thereby increasing the processing efficiency. In particular, the method and apparatus are capable of increasing a speed of processing graphic data when the width of a graphic window to be processed is broad, i.e., when there is a large amount of data to be processing using a burst mode.

What is claimed is:

1. A method of accelerating two-dimensional graphic data, the method comprising:
    dividing a memory area storing pixel data aligned in units of bytes into at least two pixel data regions based upon word boundaries of the memory, one pixel data region to be processed using a burst mode and the remainder of the at least two pixel data regions to be processed in units of bytes; and
    individually performing predetermined graphic processing on the divided pixel data regions.

2. The method of claim 1, wherein during the division of the memory region, the sizes of the pixel data regions are smaller than a width of the memory area storing the pixel data of the graphic window.

3. The method of claim 1, wherein the pixel data stored in the memory area is expressed as 8 bits per pixel, 16 bits per pixel or 24 bits per pixel.

4. The method of claim 1, wherein during the graphic processing, a raster operation is performed on the pixel data in the graphic window.

5. The method of claim 4, wherein the raster operation is performed by receiving a raster operation code that is provided by an operating system.

6. The method of claim 5, wherein the raster operation code comprises a positive SRCCOPY or negative SRC-COPY raster operation code.

7. A method of accelerating two-dimensional graphic data, comprising:
   receiving information regarding a width of a graphic window to be processed;
   reading pixel data from a memory in which pixel data in the graphic window is stored and aligned in units of bytes;
   receiving information regarding at least two pixel data regions which are divided from the memory area based on the width information of the graphic window and word boundaries of the memory, one pixel data region to be processed using a burst mode and the remainder of the at least two pixel data regions to be processed in units of bytes; and
   individually performing predetermined graphic processing on the divided pixel data regions.

8. The method of claim 7, wherein during the graphic processing, a raster operation is performed on the pixel data in the graphic window.

9. The method of claim 8, wherein the raster operation is performed by receiving a raster operation code that is provided by an operating system.

10. An apparatus for accelerating two-dimensional graphic data, comprising:
    a software device driver that receives information regarding the width of a graphic window to be processed and a location of pixel data that is stored aligned in units of bytes, and divides the pixel data in the graphic window into at least two pixel data regions based upon word boundaries of the location of pixel data, one pixel data region to be processed using a burst mode and the remainder of the at least two pixel data regions to be processed in units of bytes;
    a window division information receiving unit which receives the information regarding the division of the graphic window and then receives the divided pixel data regions from memory, which stores the pixel data of the graphic window, based on the division information; and
    a graphic operation performing unit which performs predetermined graphic processing on the divided pixel data regions.

11. The apparatus of claim 10, wherein the software device driver divides the pixel data in the graphic window into the at least two pixel data regions whose sizes are smaller than the size of the memory that stores the pixel data of the graphic window.

12. The apparatus of claim 10, wherein the pixel data is expressed as 8 bits per pixel, 16 bits per pixel or 24 bits per pixel.

13. The apparatus of claim 10, wherein during the predetermined graphic processing, a raster operation is performed on the pixel data in the graphic window.

14. The apparatus of claim 13, wherein the raster operation is performed by receiving a raster operation code that is provided by an operating system.

15. The apparatus of claim 14, wherein the rater operation code comprises a positive SRCCOPY or negative SSRC-COPY raster operation code.

16. A computer readable recording medium bearing a program for executing a method of accelerating two-dimensional graphic data in a computer, wherein the method comprises:
    dividing a memory area storing pixel data aligned in units of bytes into at least two pixel data regions based upon word boundaries of the memory, one pixel data region to be processed using a burst mode and the remainder of the at least two pixel data regions to be processed in units of bytes; and
    individually performing predetermined graphic processing on the divided pixel data regions.

17. A computer readable recording medium which records a program for executing a method of accelerating two-dimensional graphic data in a computer, wherein the method comprises:
    receiving information regarding a width of a graphic window to be processed;
    reading pixel data from a memory in which pixel data in the graphic window is stored and aligned in units of bytes;
    receiving information regarding at least two pixel data regions which are divided from the memory area based on the width information of the graphic window and word boundaries of the memory, one pixel data region to be processed using a burst mode and the remainder of the at least two pixel data regions to be processed in units of bytes; and
    individually performing predetermined graphic processing on the divided pixel data regions.

* * * * *